United States Patent
Mate et al.

(10) Patent No.: US 10,273,962 B2
(45) Date of Patent: Apr. 30, 2019

(54) SYSTEM FOR SELECTIVELY BYPASSING FLUID SUPPLY TO ONE OR MORE OPERATIONAL SYSTEMS OF A MACHINE

(71) Applicant: Caterpillar Inc., Peoria, IL (US)

(72) Inventors: Edward William Mate, Manhattan, IL (US); Michael D. Hudson, Mt. Zion, IL (US)

(73) Assignee: Caterpillar Inc., Deerfield, IL (US)

( * ) Notice: Subject to any disclaimer, the term of this patent is extended or adjusted under 35 U.S.C. 154(b) by 321 days.

(21) Appl. No.: 15/275,784

(22) Filed: Sep. 26, 2016

(65) Prior Publication Data

US 2017/0009783 A1 Jan. 12, 2017

(51) Int. Cl.
  F04D 25/04 (2006.01)
  F16H 61/4035 (2010.01)
  F16H 61/4148 (2010.01)
  F01P 7/04 (2006.01)

(52) U.S. Cl.
  CPC ......... F04D 25/04 (2013.01); F16H 61/4035 (2013.01); F16H 61/4148 (2013.01); F01P 7/044 (2013.01); F15B 2211/40507 (2013.01); F15B 2211/40592 (2013.01); F15B 2211/411 (2013.01); F15B 2211/41572 (2013.01); F15B 2211/7058 (2013.01); F15B 2211/7135 (2013.01); F15B 2211/7142 (2013.01)

(58) Field of Classification Search
  CPC .............. F01P 7/044; F15B 2211/7058; F16H 61/4035; F16H 61/4148; F04D 25/04
  See application file for complete search history.

(56) References Cited

U.S. PATENT DOCUMENTS

| | | | |
|---|---|---|---|
| 4,446,697 A | 5/1984 | Goscenski, Jr. | |
| 4,539,943 A | 9/1985 | Tsuchikawa et al. | |
| 6,016,657 A | 1/2000 | Buschur | |
| 6,681,568 B2* | 1/2004 | Smith | F01P 7/044 |
| | | | 60/422 |
| 6,845,614 B2 | 1/2005 | Stahlman | |
| 6,848,255 B2* | 2/2005 | Chiaramonte | F01P 7/044 |
| | | | 60/456 |
| 8,701,397 B2 | 4/2014 | Tanaka et al. | |
| 8,826,654 B2 | 9/2014 | Nelson et al. | |
| 8,844,279 B2 | 9/2014 | Nelson et al. | |
| 9,366,272 B2 | 6/2016 | Bieker et al. | |
| 9,512,831 B2* | 12/2016 | Rill | F01P 7/044 |

(Continued)

*Primary Examiner* — Abiy Teka
(74) *Attorney, Agent, or Firm* — William R. Tinker

(57) ABSTRACT

A hydraulic system is provided to selectively and independently route pressurized fluid to one or more operational systems of a machine. The hydraulic system is capable of switching fluid flow in operation from one of the operational systems to another of the operational systems in the event of hydraulic drive power being required by the latter one of the operational systems. The hydraulic system is also configured to continue supplying a nominal amount of fluid to support one or more auxiliary functions, for example, a lubrication system for bearings associated with the former one of the operational systems while routing the pressurized fluid to the latter one of the operational systems. A recirculation and anti-cavitation arrangement is also provided to allow recirculation of fluid to a hydraulic motor in the former one of the operational systems when pressurized fluid is being routed to the latter one of the operational systems.

17 Claims, 3 Drawing Sheets

(56) References Cited

U.S. PATENT DOCUMENTS

| | | | |
|---|---|---|---|
| 2010/0303643 A1* | 12/2010 | Kataoka | E02F 9/2203 417/213 |
| 2012/0134848 A1 | 5/2012 | Nelson et al. | |
| 2013/0213023 A1 | 8/2013 | Eckstein et al. | |
| 2014/0033692 A1* | 2/2014 | Nelson | B60K 6/12 60/327 |

* cited by examiner

SYSTEM FOR SELECTIVELY BYPASSING FLUID SUPPLY TO ONE OR MORE OPERATIONAL SYSTEMS OF A MACHINE

TECHNICAL FIELD

The current disclosure relates to a hydraulic system of a machine, and more particularly to a system for selectively bypassing fluid supply to an auxiliary driven equipment of a machine.

BACKGROUND

Machines such as large mining trucks, off-highway trucks, dozers, motor graders, wheel loaders and the like may include more than one operational system therein for example, a hoist system, a lubrication system, a cooling system, and the like. Such machines could also include a single hydraulic pump that is configured to provide pressurized fluid for driving one or more of the operational systems present on the machine. However, in some cases, it may be required to switch a flow of fluid from the pump so that fluid bypasses one of the operational systems, for example a cooling system, and is routed into driving another one of the operational systems, for example a hoist system. Moreover, although the fluid may be switched from one of the operational systems into driving another of the operational systems, one or more auxiliary functions, for example, a lubrication system for bearings associated with the former one of the operational systems may still need to be supported.

Hence, there is a need for a hydraulic system that can easily and conveniently switch fluid from one operational system to another while also supporting one or more auxiliary functions associated with the operational system to which fluid has been bypassed.

SUMMARY OF THE DISCLOSURE

In one aspect of the current disclosure, a hydraulic system includes a tank, and a pump fluidly coupled to the tank. The hydraulic system also includes an inlet valve that is disposed in fluid communication with the pump via a first inlet passage. The inlet valve has a first biasing element that is configured to bias the inlet valve into a flow-blocking position. The hydraulic system also includes a hydraulic motor that is fluidly coupled to the inlet valve via a second inlet passage. The hydraulic motor is configured to operatively rotate a fan supported thereon.

The hydraulic system further includes an outlet valve that is located downstream of the hydraulic motor and disposed in fluid communication with the hydraulic motor via a first outlet passage. The outlet valve has a second biasing element that is configured to bias the outlet valve into a flow-blocking position. The outlet valve is configured to selectively return fluid from the hydraulic motor to the tank via a second outlet passage.

Moreover, the hydraulic system also includes a solenoid-operated check valve disposed parallel to the hydraulic motor and fluidly coupled with each of the first inlet passage and the second outlet passage via respective ones of a first control passage and a second control passage. The hydraulic system further includes a first pilot control passage that is configured to branch-off from the first control passage and fluidly couple with the inlet valve for operatively biasing the inlet valve into a flow-blocking position. Further, the hydraulic system also includes a second pilot control passage that is configured to branch-off from the first inlet passage and fluidly coupled to the inlet valve for operatively biasing the inlet valve into a flow-permitting position.

Furthermore, the hydraulic system also includes a third pilot control passage that is configured to branch-off from at least one of the first pilot control passage and the second control passage. The third pilot control passage is fluidly coupled to the outlet valve for operatively biasing the outlet valve into a flow-blocking position. The hydraulic system also includes a fourth pilot control passage that is configured to branch-off from the first outlet passage and fluidly couple with the outlet valve for operatively biasing the outlet valve into a flow-permitting position.

In an additional aspect of this disclosure, the pump is a variable displacement pump.

In yet another additional aspect of this disclosure, the solenoid-operated check valve is a two-way two-position unidirectional valve that is operably moveable between a flow-permitting position and a flow-blocking position. Further, each of the inlet valve and the outlet valve is a two-way two-position valve.

In yet another aspect of this disclosure, if the solenoid-operated check valve is operatively moved into the flow-permitting position, the inlet valve is biased into the flow-permitting position by fluid pressure from the pump via the first inlet passage and the second pilot control passage for routing pressurized fluid from the pump to the hydraulic motor via the first and second inlet passages.

In yet another aspect of this disclosure, a first orifice disposed in the first control passage, the first orifice being configured to reduce an amount of fluid bypassing the hydraulic motor and being routed from the first inlet passage back to the tank via the first control passage, the second control passage and the second outlet passage when the solenoid-operated check valve is in the flow-permitting position.

In yet another aspect of this disclosure, if the solenoid-operated check valve is operatively moved into the flow-blocking position, the inlet valve is biased into the flow-blocking position by a sum of the biasing force provided by the first biasing element associated with the inlet valve and a force of the fluid pressure from the pump via the first inlet passage, the first control passage, and the first pilot control passage such that pressurized fluid from the pump is routed from the pump to an auxiliary driven equipment disposed parallel to the inlet valve and fluidly coupled to the first inlet passage.

Also, when the solenoid-operated check valve is operatively moved into the flow-blocking position, the outlet valve is configured to remain closed unless a pressure of fluid in the first outlet passage and the fourth pilot control passage overcomes a sum of pressures applied by the second biasing element and a pressure of fluid in the third pilot control passage.

In yet another aspect of this disclosure, a motor drain line configured to fluidly couple the hydraulic motor and the second outlet passage. Further, a relief valve is located upstream of the outlet valve and configured to fluidly couple with the first outlet passage and the motor drain line. The relief valve is configured to allow fluid to be drained from the hydraulic motor to the tank via the first outlet passage disposed upstream of the outlet valve, the motor drain line and the second outlet passage.

Moreover, the relief valve is also provided with a third biasing element that is configured to bias the relief valve into a flow-blocking position. A relief pressure setting associated with the third biasing element of the relief valve is more than an actuation pressure setting associated with the second biasing element of the outlet valve such that a pressure of fluid downstream of the hydraulic motor is configured to open the relief valve prior to opening the outlet valve when the solenoid-operated check valve is in the blocking position.

In yet another aspect of this disclosure, the hydraulic system further includes a recirculation line that is fluidly coupled with the second inlet passage and the first outlet passage. The recirculation line has a unidirectional spring-loaded anti-cavitation check valve disposed therein. The anti-cavitation check valve is configured to selectively allow fluid to be recirculated from the first outlet passage downstream of the hydraulic motor to the second inlet passage upstream of the hydraulic motor. Moreover, a relief pressure setting associated with the anti-cavitation valve is less than the relief pressure setting associated with the relief valve.

In yet another aspect of this disclosure, the hydraulic system further includes a bypass line that is configured to fluidly couple the first inlet passage with the second inlet passage. The bypass line includes a second orifice disposed therein for permitting fluid with a reduced pressure and flow rate as compared to a pressure and flow rate of fluid in the first inlet passage.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
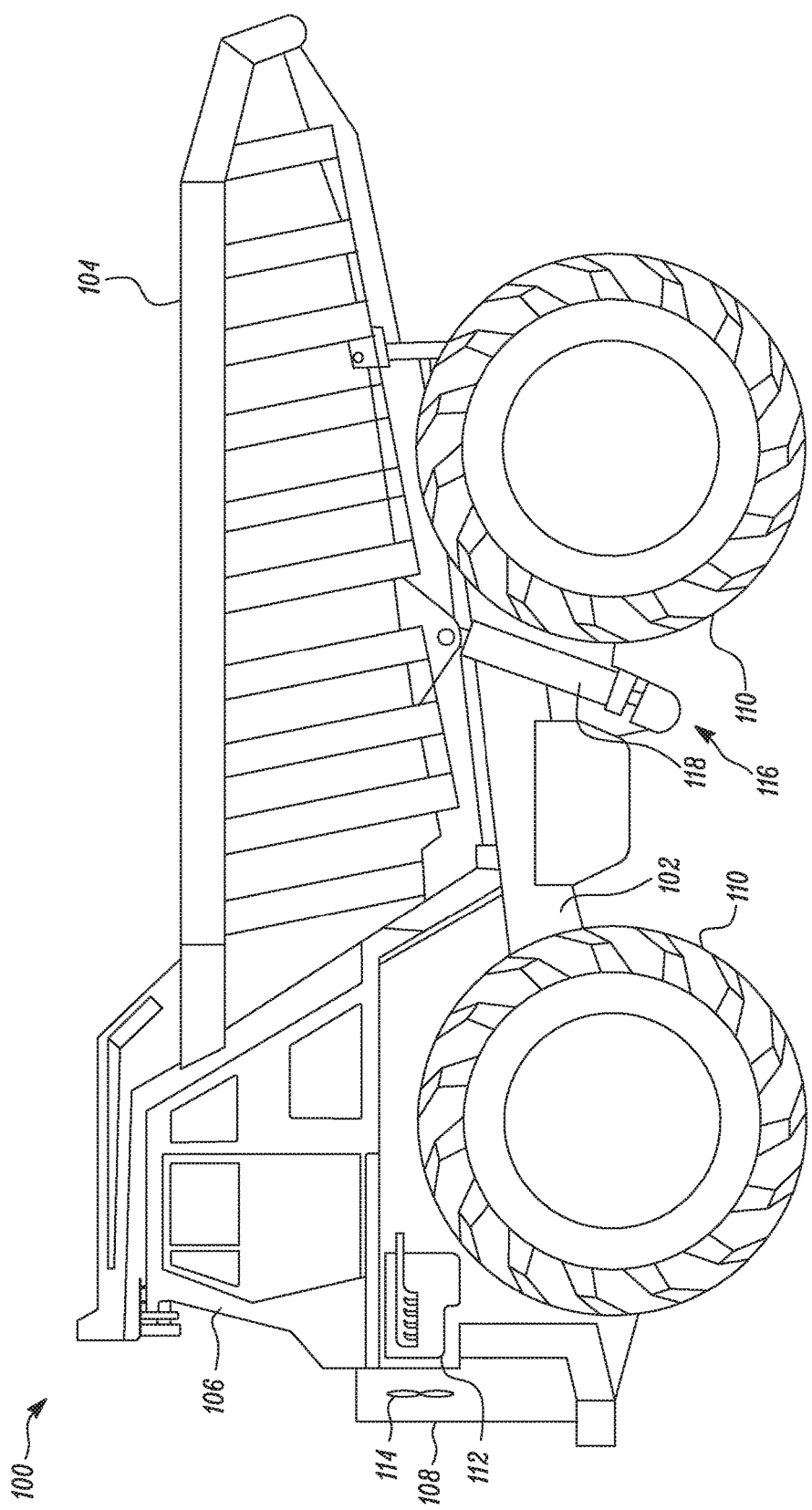
FIG. 1 is a side view of an exemplary machine.

FIG. 1 illustrates an exemplary machine 100, according to an embodiment of the present disclosure. As illustrated in FIG. 1, the machine 100 may be embodied as a large mining truck. In various other aspects, the machine 100 may be an off-highway truck, a dozer, a motor grader, a wheel loader or any other machine which may perform various operations associated with an industry such as mining, construction, farming, transportation, or any other industry known in the art.

Referring to FIG. 1, the machine 100 may include a frame 102. A payload carrier 104 may be pivotally supported on the frame 102. Further, an operator cab 106 may be mounted to the frame 102, such as above an engine enclosure 108 and on a front part of the frame 102. The machine 100 may be supported on the ground by a plurality of ground engaging members 110, such as wheels. One or more power sources 112 may be housed within the engine enclosure 108 that provides power to one or more onboard operational systems (e.g., to a cooling system, a drive system, a hoist system 116, a tool system, a lubrication system, etc.). The power source 112 may be a diesel engine, a gasoline engine, a gaseous fuel-powered engine, a hydrogen-powered engine, or any other type of combustion engine known in the art. Alternatively, the power source 112 may be a non-combustion source of power such as a fuel cell, a power storage device, a solar cell, or another suitable source of power. The power source 112 may produce mechanical and/or electrical power output, which may be converted to hydraulic power in the form of pressurized fluid.

Further, the machine 100 may include one or more operational systems that are operatively connected to the power source 112. The power source 112 may provide rotational power to the operational systems. In an aspect of this disclosure, one of the operational systems may be a hydraulic system 200/300 (shown in the illustrated embodiments of FIG. 2 and FIG. 3 respectively) for a fan 114 associated with the power source 112. The hydraulic system 200/300 is also configured to selectively provide pressurized fluid for driving other operational systems, for example, the hoist system 116 (as shown in FIG. 1) having one or more hydraulic cylinders 118 for raising or lowering the payload carrier 104 relative to the frame 102.

Figure 2:
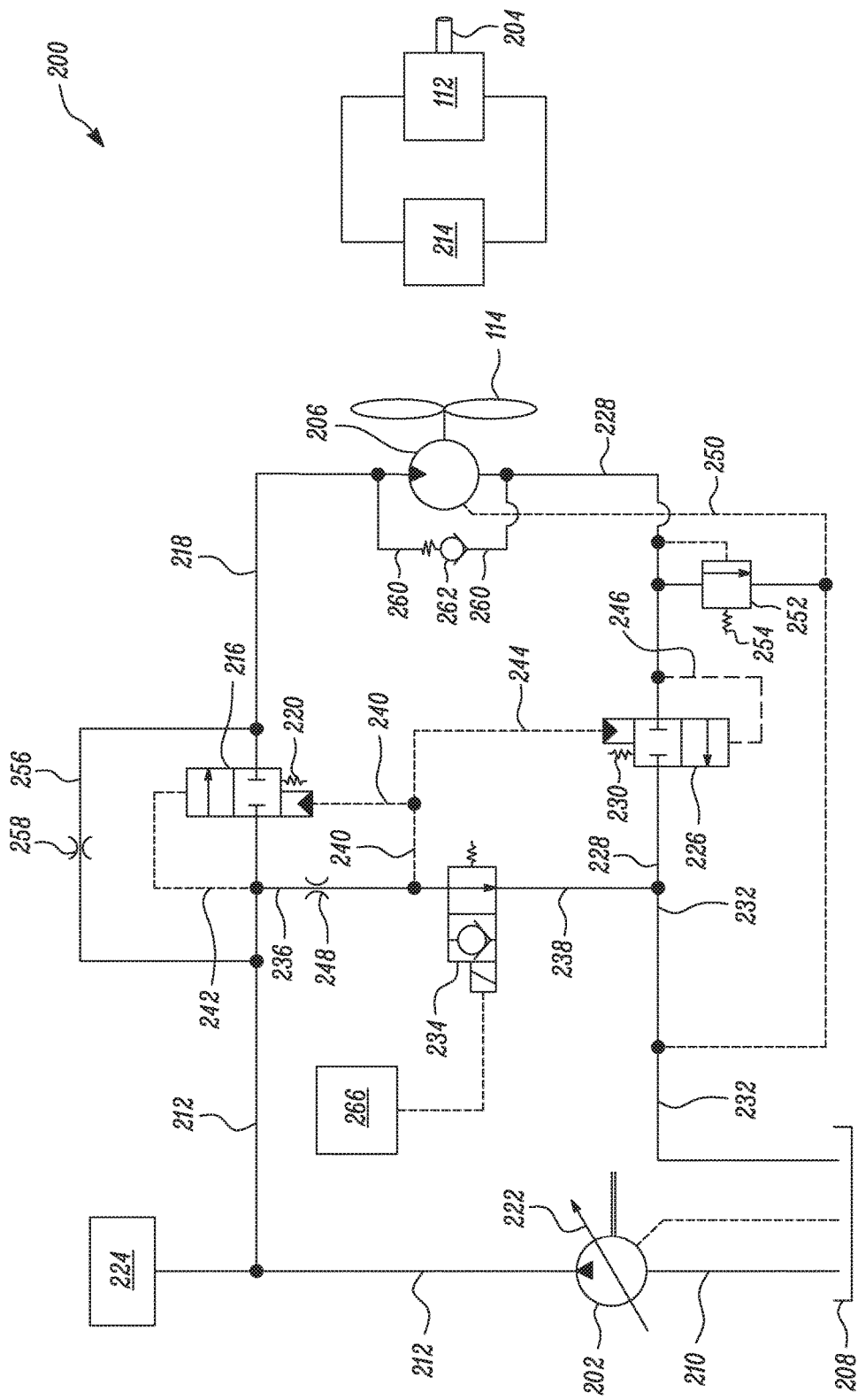
FIG. 2 is a schematic of a hydraulic system that can be employed by the exemplary machine of FIG. 1, according to an embodiment of the present disclosure.

FIG. 2 illustrates a hydraulic system 200 for cooling the power source 112, in accordance with an embodiment of the present disclosure. In an aspect of the present disclosure, the hydraulic system 200 includes a pump 202 that is mechanically connected directly to an output shaft 204 of the power source 112, a hydraulic motor 206 that is fluidly connected to the pump 202, and the fan 114 is mechanically connected to and driven by the hydraulic motor 206. The power source 112 may drive the pump 202 via the output shaft 204 to draw in low-pressure fluid from a tank 208 via a suction passage 210 and discharge the fluid at an elevated pressure into a first inlet passage 212. The hydraulic motor 206 receives and converts the pressurized fluid to mechanical power that drives the fan 114 to generate a flow of air. The flow of air may be used to cool the power source 112 directly and/or indirectly by way of a heat exchanger 214, as desired.

In an exemplary embodiment, the pump 202 may embody a rotary or piston-driven pump having a crankshaft (not shown) connected to the power source 112 via the output shaft 204 such that a rotation of the output shaft 204 results in a corresponding pumping motion of the pump 202. The pumping motion of the pump 202 may function to draw in the low-pressure fluid from the tank 208, and discharge the fluid at the elevated pressure to the hydraulic motor 206 via the first inlet passage 212, an inlet valve 216 and through a second inlet passage 218. In an aspect of the present disclosure, the inlet valve 216 is provided with a first biasing element 220 that is configured to bias the inlet valve 216 into a flow-blocking position.

In the embodiment of FIG. 2, the pump 202 may be a unidirectional, variable-displacement hydraulic pump equipped with a stroke-adjusting mechanism 222, for example a swash plate, a position of which can be hydromechanically adjusted based on, among other things, a desired speed of the fan 114 (or a desired cooling of the power source 112 facilitated by the fan 114), or a pressure of fluid required by another operational system 224, for example, the hoist system 116 to vary an output (e.g., a discharge rate) of the pump 202.

The hydraulic system 200 further includes an outlet valve 226 that is located downstream of the hydraulic motor 206 and disposed in fluid communication with the hydraulic motor 206 via a first outlet passage 228. As shown, each of the inlet valve 216 and the outlet valve 226 is a two-way two-position hydraulically actuated valve. The outlet valve 226 has a second biasing element 230 that is configured to bias the outlet valve 226 into a flow-blocking position. The outlet valve 226 is configured to selectively return fluid from the hydraulic motor 206 to the tank 208 via a second outlet passage 232.

Moreover, the hydraulic system 200 also includes a solenoid-operated check valve 234 disposed parallel to the hydraulic motor 206 and fluidly coupled with each of the first inlet passage 212 and the second outlet passage 232 via respective ones of a first control passage 236 and a second control passage 238. In an aspect of the present disclosure, the solenoid-operated check valve 234 may be embodied as a two-way two-position unidirectional valve that is operably moveable between a flow-permitting position and a flow-blocking position.

The hydraulic system 200 further includes a first pilot control passage 240 that is configured to branch-off from the first control passage 236 and fluidly couple with the inlet valve 216 for operatively biasing the inlet valve 216 into a flow-blocking position. Furthermore, the hydraulic system 200 also includes a second pilot control passage 242 that is configured to branch-off from the first inlet passage 212 and fluidly couple with the inlet valve 216 for operatively biasing the inlet valve 216 into a flow-permitting position.

Additionally, as shown in the particular embodiment of FIG. 2, the hydraulic system 200 also includes a third pilot control passage 244 that is configured to branch-off from the first pilot control passage 240. The third pilot control passage 244 is configured to fluidly couple with the outlet valve 226 for operatively biasing the outlet valve 226 into a flow-blocking position. Further, the hydraulic system 200 also includes a fourth pilot control passage 246 that is configured to branch-off from the first outlet passage 228 and fluidly couple with the outlet valve 226 for operatively biasing the outlet valve 226 into a flow-permitting position.

During a first mode of operation, when the solenoid-operated check valve 234 is operatively moved into the flow-permitting position, the inlet valve 216 is biased into the flow-permitting position. In this mode of operation, fluid pressure upstream of the solenoid-operated check valve 234 i.e., in the first control passage 236 corresponds with a pressure of fluid supplied by the pump 202 via the first inlet passage 212 which would be greater than fluid pressure downstream of the solenoid-operated check valve 234 i.e., in the second control passage 238. As such, it will be acknowledged by persons skilled in the art that pressure of fluid in the second control passage 238 would initially be equal to or nearly equal to that of fluid present in the tank 208, which is generally maintained at an ambient pressure value less than the pressure of the fluid in the first inlet passage 212 and the first control passage 236, prior to receiving fluid from the first control passage 236 via the open solenoid-operated check valve 234 during the first mode of operation. With the solenoid-operated check valve 234 operatively moved into the flow-permitting position, the pressure of fluid in the first pilot control passage 240 would initially be equal to or nearly equal to that of fluid present in the second control passage 238.

As fluid pressure in the second pilot control passage 242 also corresponds with the pressure of fluid in the first inlet passage 212, fluid pressure in the second pilot control passage 242 increases to overcome a sum of forces offered by the pressure of fluid in the first pilot control passage 240 and a biasing force associated with the first biasing element 220. Consequently, the inlet valve 216 may be biased into its flow-permitting position by the pressure of fluid from the pump 202 via the first inlet passage 212 and the second pilot control passage 242 for routing pressurized fluid from the pump 202 to the hydraulic motor 206 via the first and second inlet passages 212, 218. As pressurized fluid from the first inlet passage 212 enters the hydraulic motor 206 via the inlet valve 216 and through the second inlet passage 218, the pressurized fluid drives the hydraulic motor 206 so as to rotate the fan 114 and accomplish a cooling of the power source 112 directly, or indirectly via the heat exchanger 214, as desired.

Also, in the first mode of operation i.e., when the solenoid-operated check valve 234 is operatively moved into the flow-permitting position, it is envisioned that some portion of the fluid from the first inlet passage 212 may tend to be routed back to the tank 208 via the first control passage 236, the second control passage 238 and the second outlet passage 232. In an aspect of this disclosure, it is therefore contemplated to provide a first orifice 248 in the first control passage 236 so that the first orifice 248 beneficially reduces an amount of fluid being routed from the first inlet passage 212 back to the tank 208 via the first control passage 236, the second control passage 238 and the second outlet passage 232 when the solenoid-operated check valve 234 is in the flow-permitting position.

Further, in the first mode of operation, as the solenoid-operated check valve 234 is disposed in its flow-permitting position, fluid pressure in the third pilot control passage 244 would be equal to the pressure of fluid in the first pilot control passage 240. Particularly, fluid pressure in the third pilot control passage 244 would also decrease slightly corresponding to a loss of fluid from the first pilot control passage 240 to the tank 208 via the solenoid-operated check valve 234, the second control passage 238, and the second outlet passage 232. As fluid pressure in the fourth pilot control passage 246 also corresponds with the pressure of fluid in the first outlet passage 228, fluid pressure in the fourth pilot control passage 246 increases to overcome a sum of forces offered by the pressure of fluid in the third pilot control passage 244 and a biasing force associated with the second biasing element 230. Consequently, the outlet valve 226 may be biased into its flow-permitting position by the pressure of fluid from the motor 206 discharge via the first outlet passage 228 and the fourth pilot control passage 246.

During a second mode of operation, the solenoid-operated check valve 234 is operatively moved into the flow-blocking position to bias the inlet valve 216 into its corresponding flow-blocking position. In this mode of operation, upon positioning the solenoid-operated check valve 234 into the flow-blocking position, fluid pressure upstream of the solenoid-operated check valve 234 i.e., in the first control passage 236 corresponds with a pressure of fluid supplied by the pump 202 via the first inlet passage 212. Further, a pressure of fluid in the first and second pilot control passages 240, 242 would be equal to one another. Consequently, a sum of the biasing force provided by the first biasing element 220 and a force of the fluid pressure from the pump 202 via the first inlet passage 212, the first control passage 236, and the first pilot control passage 240 overcomes the forces associated with fluid pressure from the second pilot control passage 242 alone so that the inlet valve 216 is biased into its corresponding flow-blocking position. This way, pressurized fluid from the pump 202 can be routed from the pump 202 to another one of the operational systems 224, for example, the hoist system 116 of the machine 100. As shown, the operational system 224 is disposed parallel to the inlet valve 216 and fluidly coupled to the first inlet passage 212 upstream of the inlet valve 216.

Further, in the second mode of operation, as the solenoid-operated check valve 234 is disposed in its flow-blocking position, fluid pressure from the third pilot control passage 244 that corresponds with a pressure of fluid supplied by the pump 202 via the first pilot control passage 240, serves to actively bias the outlet valve 226 into its corresponding flow-blocking position. The outlet valve 226 can therefore open only when a pressure of fluid downstream of the hydraulic motor 206 i.e., pressure of fluid in the first outlet passage 228 upstream of the outlet valve 226 or the pressure of fluid in the fourth pilot control passage 246 overcomes the pressure of fluid from the third pilot control passage 244 which is likely to occur only if the solenoid-operated check valve 234 is shifted into its flow-permitting position. Therefore, until a pressure of fluid in the first pilot control passage 240 and the third pilot control passage 244 is reduced by a movement of the solenoid-operated check valve 234 into its flow-permitting position, the outlet valve 226 continues to remain in its corresponding flow-blocking position.

In yet another aspect of this disclosure, a motor drain line 250 is provided to fluidly couple the hydraulic motor 206 directly with the second outlet passage 232. Further, as shown in the embodiment of FIG. 2, a relief valve 252 is located upstream of the outlet valve 226. The relief valve 252 is configured to selectively couple the first outlet passage 228 in fluid communication with the motor drain line 250. The relief valve 252 has a third biasing element 254 that is configured to bias the relief valve 252 into a flow-blocking position. A relief pressure setting associated with the third biasing element 254 of the relief valve 252 is selected to limit the pressure of fluid in the first outlet passage 228. Consequently, during the second mode of operation, the relief valve 252 can move to its flow-permitting position when the solenoid-operated check valve 234 is in its flow-blocking position and at which point, the pressure of fluid in the third pilot control passage 244 corresponding to a discharge pressure of the pump 202 also biases the outlet valve 226 into its corresponding flow-blocking position.

Preferably, the relief pressure setting associated with the third biasing element 254 of the relief valve 252 would be maintained higher than a pressure setting associated with the second biasing element 230 of the outlet valve 226, but lower than a combined level of pressure setting associated with the second biasing element 230 and a pressure of fluid in the third pilot passage 244 when the solenoid-operated check valve 234 is in its flow blocking position such that a pressure of fluid downstream of the hydraulic motor 206 i.e., in the first outlet passage 228 is configured to open the relief valve 252 prior to the outlet valve 226 opening when the solenoid-operated check valve 234 is in its corresponding flow blocking position. With the aforementioned higher relief pressure setting associated with the third biasing element 254 of the relief valve 252, it is also envisioned that the relief valve 252 is likely to be active i.e., shifted into its corresponding flow-permitting position during a 'transient condition' that occurs when fluid pressure increases in the first outlet passage 228 and one or more moving parts (not shown) from the outlet valve 226 have just moved completely to their closed state.

Therefore, when the pressure of fluid downstream of the hydraulic motor 206 i.e., in the first outlet passage 228 reaches a first pressure value not exceeding a sum of forces offered by the pressure setting associated with the second biasing element 230 of the outlet valve 226 and a pressure of fluid in the third pilot passage 244 when the solenoid operated check valve 234 is in the flow blocking position, the first pressure value of fluid in the first outlet passage 228 helps to bias the relief valve 252 to open against the relief pressure setting associated with the third biasing element 254 and hence, allow fluid to be drained from downstream of the hydraulic motor 206 to the tank 208 via the first outlet passage 228 disposed upstream of the outlet valve 226, the motor drain line 250 and the second outlet passage 232.

In the embodiment of FIG. 2, the relief valve 252 helps to reduce any pressure spikes occurring in the first outlet passage 228 before the outlet valve 226 opens corresponding to a pressure of fluid in the first outlet passage 228 and the fourth pilot control passage 246 reaching a second pressure value, the second pressure value being greater than the first pressure value of fluid disclosed herein. As such, it may be noted that the outlet valve 226 is configured to move into the flow-permitting position only when the pressure of fluid in the first outlet passage 228 and the fourth pilot control passage 246 reaches the second pressure value that is also configured to overcome the sum of forces offered by the pressure of fluid in the third pilot control passage 244 and the biasing force associated with the second biasing element 230 of the outlet valve 226.

Although the solenoid-operated check valve 234 is moved into the flow-blocking position to bias the inlet valve 216 and the outlet valve 226 into their corresponding flow-blocking positions in the second mode of operation disclosed herein for bypassing fluid supply from the hydraulic motor 206 to another one of the operational systems 224, it is hereby envisioned that the hydraulic motor 206 may continue to rotate, at least for a brief period of time after the inlet valve 216 has been moved into its flow-blocking position. The rotation of the hydraulic motor 206 in the second mode of operation could occur as a result of the inertia of the fan 114 manifesting itself into driving the hydraulic motor 206, the inertia associated with the ongoing motion of the fan 114 being brought about by fluid pressure provided earlier in time from the pump 202 to the hydraulic motor 206 i.e., during the first mode of operation for rotating the fan 114 itself.

As the hydraulic motor 206 could, in turn, be driven by the fan 114 during the brief period of time in the second mode of operation, it is hereby envisioned that the hydraulic motor 206 would continue to require at least a nominal amount of fluid flow there through for accomplishing various functions such as, but not limited to, a lubrication of bearings, seals, and other components present in the hydraulic motor 206. This nominal flow of fluid could be significantly lower in pressure and flowrate as compared to a pressure and flowrate of the pressurized fluid supplied to the hydraulic motor 206 via the inlet valve 216 during the first mode of operation. To that end, it is hereby contemplated that in an aspect of this disclosure as shown in FIG. 2, the hydraulic system 200 also includes a bypass line 256 that is configured to fluidly couple the first inlet passage 212 with the second inlet passage 218. This bypass line 256 includes a second orifice 258 disposed therein for permitting the nominal amount of fluid i.e., fluid with a reduced pressure and flow rate as compared to a pressure and flow rate of fluid via the inlet valve 216, to bypass the inlet valve 216 and reach the hydraulic motor 206.

Also, in the second mode of operation, a pressure of fluid downstream of the hydraulic motor 206 i.e., in the first outlet passage 228 would increase to become greater than a pressure of fluid upstream of the hydraulic motor 206 i.e., in the second inlet passage 218 due to the inlet valve 216 being disposed in its flow-blocking position and also, at least in part, due to the outlet valve 226 being disposed in the flow-blocking position when the rotation of the hydraulic motor 206 occurs from the inertia of the rotating fan 114 during the second mode of operation. It is therefore also envisioned that during the second mode of operation, the hydraulic motor 206 may require additional fluid flow there through i.e., in addition to that being delivered by the bypass line 256 alone so that a rotation of the fan 114 can be operatively supported until the fan 114 comes to a halt when no fluid is being supplied to the hydraulic motor 206 via the inlet valve 216 in the second mode of operation.

Therefore, in an aspect of this disclosure, it is also contemplated to additionally provide a recirculation line 260 to the hydraulic system 200 in which the recirculation line 260 is fluidly coupled with the second inlet passage 218 and the first outlet passage 228 as shown in FIG. 2. The recirculation line 260 has a unidirectional spring-loaded anti-cavitation check valve 262 disposed therein. The anti-cavitation check valve 262 is configured to selectively allow fluid to be recirculated from the first outlet passage 228 downstream of the hydraulic motor 206 to the second inlet passage 218 upstream of the hydraulic motor 206 during the second mode of operation when a pressure of fluid downstream of the hydraulic motor 206 i.e., in the first outlet passage 228 is greater than a pressure of fluid upstream of the hydraulic motor 206 i.e., in the second inlet passage 218. It may be also be noted that a pressure setting associated with the anti-cavitation valve is advantageously maintained less than the relief pressure setting associated with the relief valve 252 so that the anti-cavitation check valve 262 can accomplish a rotation of the hydraulic motor 206 during the second mode of operation by merely routing fluid from the first outlet passage 228 that is disposed downstream of the hydraulic motor 206 to the second inlet passage 218 that is disposed upstream of the hydraulic motor 206. Also, as the outlet valve 226 would not open until the pressure downstream of the hydraulic motor 206 i.e., the first outlet passage 228 and the fourth pilot control passage 246 becomes sufficiently large to overcome the sum of the biasing force associated with the second biasing element 230 of the outlet valve 226 and the fluid pressure in the third pilot control passage 244, the flow-blocking position of the outlet valve 226 provides for a maximum time period for fluid to be recirculated from the first outlet passage 228 to the hydraulic motor 206 via the recirculation line 260, the anti-cavitation check valve 262 and the second inlet passage 218. Also, it is hereby contemplated that with use of the anti-cavitation check valve 262, air may be prevented from becoming entrained in the fluid supplied to the hydraulic motor 206 and the hydraulic motor 206 may hence, be prevented from encountering various detrimental effects that are known to be typically caused by cavitation.

In embodiments of this disclosure, the solenoid-operated check valve 234 may be additionally provided with a controller 266 that is disposed in communication with the solenoid-operated check valve 234. The controller 266 could be embodied in the form of an analog electrical circuitry, for example, a switch (not shown) that could be mechanically closed when operation of another one of the operational systems 224 is required e.g., when the hoist system 116 is required to raise the payload carrier relative to the frame 102 of the machine.

Alternatively, the controller 266 disclosed herein may embody a single microprocessor or multiple microprocessors that include components for actuating the solenoid-operated check valve 234 and configuring the solenoid-operated check valve 234 to perform functions consistent with the present disclosure. Numerous commercially available microprocessors can be configured to perform the functions of the controller 266 disclosed herein. It should be appreciated that the controller 266 could readily be embodied in a general purpose microprocessor capable of controlling numerous functions associated with the solenoid-operated check valve 234. The controller 266 may also include a memory, a secondary storage device, and any other components for running an application. Various other circuits may be associated with the controller 266 such as power supply circuitry, signal conditioning circuitry, solenoid driver circuitry, and other types of circuitry. Various routines, algorithms, and/or programs can be programmed within the controller 266 for execution thereof. Moreover, it should be noted that the controller 266 of the present disclosure may be implemented as a stand-alone processor or may alternatively be configured to co-operate with an existing processor/s (not shown) provided to the machine 100, for example, an electronic control module (ECM) for facilitating the solenoid-operated check valve 234 to perform functions that are consistent with the present disclosure.

Figure 3:
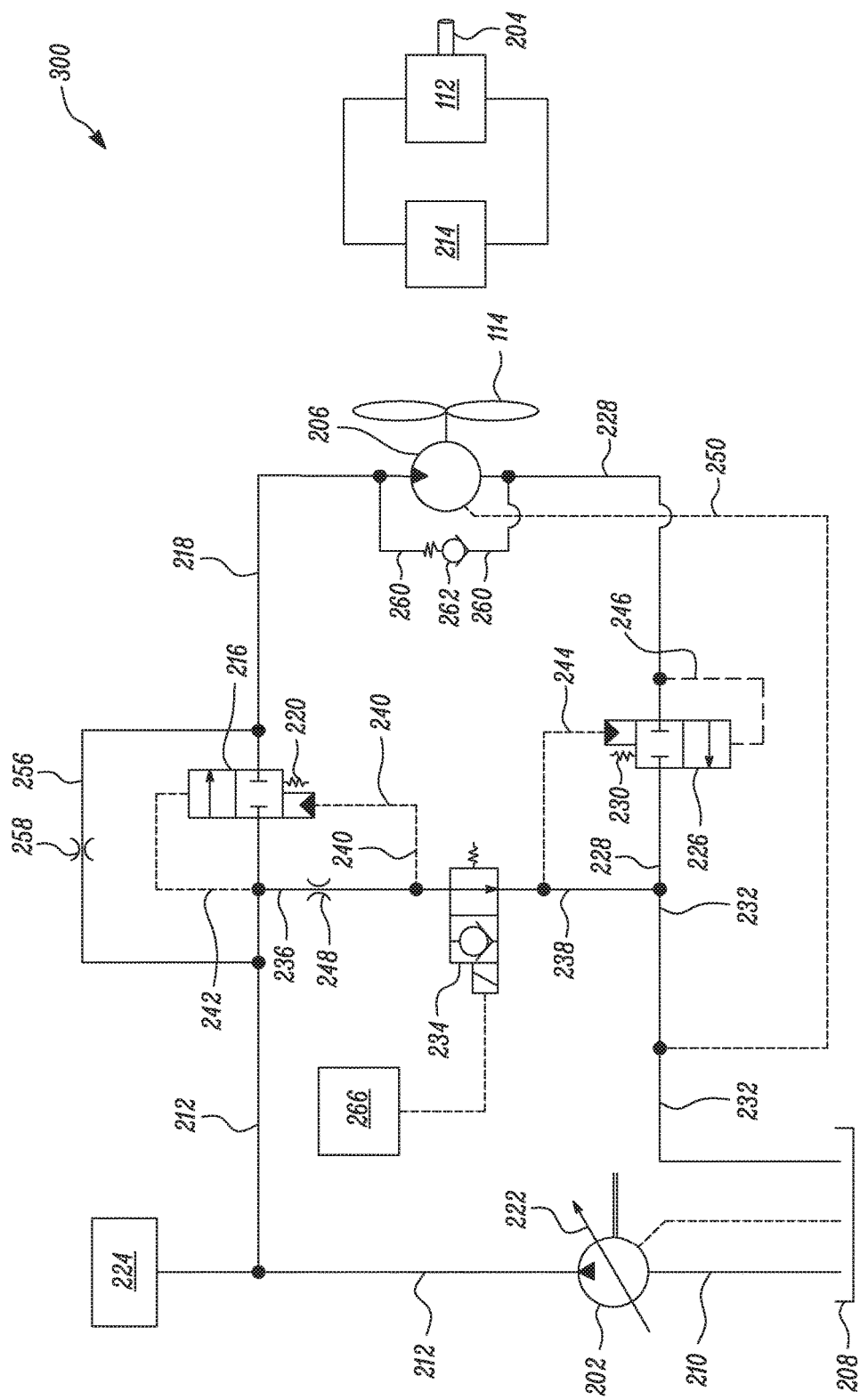
FIG. 3 is a schematic of a hydraulic system that can be employed by the exemplary machine of FIG. 1, according to another embodiment of the present disclosure.

Referring now to FIG. 3, illustrated is a schematic view of a hydraulic system 300 in accordance with another embodiment of this disclosure. As most of the components from the hydraulic system 300 are generally reminiscent of the components disclosed in the hydraulic system 200 of FIG. 2, like numerals from the hydraulic system 200 of FIG. 2 have been used to refer to functionally similar components in the embodiment of the hydraulic system 300 shown in FIG. 3. Moreover, for the sake of brevity and simplicity in this document, explanation is only rendered to features that are unique to the embodiment of the hydraulic system 300 shown in FIG. 3.

As shown in the particular embodiment of the hydraulic system 300 of FIG. 3, the third pilot control passage 244 is configured to couple the second control passage 238 with the outlet valve 226 for biasing the outlet valve 226 into its corresponding flow-blocking position. To commence operation of the hydraulic system 300 in its first mode of operation, the solenoid-operated check valve 234 is moved into its flow-permitting position. Consequently, the inlet valve 216 would be biased into its corresponding flow-permitting position as the fluid pressure in the second pilot control passage 242 would be greater than a sum of the biasing force offered by the first biasing element 220 and a force of the fluid pressure from the first pilot control passage 240. This way, pressurized fluid can be routed from the pump 202 to the hydraulic motor 206 through the first inlet passage 212, via the inlet valve 216 and through the second inlet passage 218.

When the pressure of fluid in the first outlet passage 228 and the fourth pilot control passage 246 increases sufficiently enough to overcome the sum of the biasing force associated with the second biasing element 230 and the force of fluid pressure in the third pilot control passage 244, then the outlet valve 226 would be biased into its corresponding flow-permitting position whereby fluid downstream of the hydraulic motor 206 i.e., from the first outlet passage 228 can be drained back to the tank 208 via the outlet valve 226 and through the second outlet passage 232.

To that end, in this embodiment, a higher pressure setting of the second biasing element 230 is advantageously selected as compared to the pressure setting of the anti-cavitation check valve 262. Moreover, the higher pressure setting of the second biasing element 230 may further be selected so as to correspond with a relief pressure setting associated with the relief valve 252 in the embodiment of the hydraulic system 200 from FIG. 2. This way, the anti-cavitation check valve 262 would he biased open at a pressure value that is less than the pressure setting of the second biasing element 230 associated with the outlet valve 226. In this embodiment, use of a relief valve such as the relief valve 252 used in the embodiment of the hydraulic system 200 of FIG. 2 can be avoided and additional costs previously incurred with the provision of the relief valve 252 can be offset.

INDUSTRIAL APPLICABILITY

The disclosed hydraulic system 200/300 may be applicable to any work machine 100 that includes more than one hydraulically powered operational system and a single pump that is required to selectively and independently deliver pressurized fluid for driving the operational systems.

Aspects of the present disclosure render the hydraulic system 200/300 capable of switching fluid flow in operation from one of the operational systems, for example, the hydraulic motor 206 to another of the operational systems 224, for example, the hoist system 116 in the event of hydraulic drive power being required by the latter one of the operational systems 224. The hydraulic system 200/300 can also continue to supply a nominal amount of fluid that is required to support one or more auxiliary functions, for example, a lubrication system for bearings (not shown) associated with the former one of the operational systems i.e., the hydraulic motor 206 while routing the pressurized fluid to the latter one of the operational systems 224. The recirculation line 260 and the anti-cavitation check valve 262 arrangement is also provided to allow recirculation of fluid to the hydraulic motor 206 in the former one of the operational systems when pressurized fluid is being routed to the latter one of the operational systems 224 and prevent cavitation in the hydraulic motor 206 that could otherwise deteriorate a performance of the hydraulic motor 206 mod/or require undesired costs, time and effort previously incurred with maintenance of a hydraulic motor that is typically subject to cavitation.

While aspects of the present disclosure have been particularly shown and described with reference to the embodiments above, it will be understood by lose skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic system comprising:
a tank;
a pump fluidly coupled to the tank;
an inlet valve disposed in fluid communication with the pump via a first inlet passage, the inlet valve having a first biasing element configured to bias the inlet valve into a flow-blocking position;
a hydraulic motor fluidly coupled to the inlet valve via a second inlet passage, the hydraulic motor being configured to operatively rotate a fan supported thereon;
an outlet valve located downstream of the hydraulic motor and disposed in fluid communication with the hydraulic motor via a first outlet passage, the outlet valve having a second biasing element configured to bias the outlet valve into a flow-blocking position, the outlet valve being configured to selectively return fluid from the hydraulic motor to the tank via a second outlet passage;
a solenoid-operated check valve disposed parallel to the hydraulic motor and fluidly coupled with each of the first inlet passage and the second outlet passage via respective ones of a first control passage and a second control passage;
a first pilot control passage configured to branch-off from the first control passage and fluidly couple with the inlet valve for operatively biasing the inlet valve into a flow-blocking position;
a second pilot control passage configured to branch-off from the first inlet passage and fluidly couple with the inlet valve for operatively biasing the inlet valve into a flow-permitting position;
a third pilot control passage configured to branch-off from at least one of the first pilot control passage and the second control passage, the third pilot control passage fluidly coupled with the outlet valve for operatively biasing the outlet valve into a flow-blocking position; and
a fourth pilot control passage configured to branch-off from the first outlet passage and fluidly couple with the outlet valve for operatively biasing the outlet valve into a flow-permitting position.

2. The hydraulic system of claim 1, wherein the pump is a variable displacement pump.

3. The hydraulic system of claim 1, wherein the solenoid-operated check valve is a two-way two-position unidirectional valve operably moveable between a flow-permitting position and a flow-blocking position.

4. The hydraulic system of claim 1, wherein each of the inlet valve and the outlet valve is a two-way two-position valve.

5. The hydraulic system of claim 1, wherein if the solenoid-operated check valve is operatively moved into the flow-permitting position, the inlet valve is biased into the flow-permitting position by fluid pressure from the pump via the first inlet passage and the second pilot control passage for routing pressurized fluid from the pump to the hydraulic motor via the first and second inlet passages.

6. The hydraulic system of claim 5 further comprising a first orifice disposed in the first control passage, the first orifice being configured to reduce an amount of fluid being routed from the first inlet passage back to the tank via the first control passage, the second control passage and the second outlet passage when the solenoid-operated check valve is in the flow-permitting position.

7. The hydraulic system of claim 1, wherein if the solenoid-operated check valve is operatively moved into the flow-blocking position, the inlet valve is biased into the flow-blocking position by a sum of the biasing force provided by the first biasing element associated with the inlet valve and a force of the fluid pressure from the pump via the first inlet passage, the first control passage, and the first pilot control passage such that pressurized fluid from the pump is routed from the pump to one or more operational systems disposed parallel to the inlet valve and fluidly coupled to the first inlet passage upstream of the inlet valve.

8. The hydraulic system of claim 7, wherein when the solenoid-operated check valve is operatively moved into the flow-blocking position, the outlet valve is configured to remain closed unless a pressure of fluid in the first outlet passage and the fourth pilot control passage overcomes a sum of pressures applied by the second biasing element and a pressure of fluid in the third pilot control passage.

9. The hydraulic system of claim 1 further comprising a motor drain line configured to fluidly couple the hydraulic motor and the second outlet passage.

10. The hydraulic system of claim 9 further comprising a relief valve located upstream of the outlet valve and configured to fluidly couple with the first outlet passage and the motor drain line, the relief valve configured to allow fluid to be drained from the hydraulic motor to the tank via the first outlet passage disposed upstream of the outlet valve, the motor drain line and the second outlet passage.

11. The hydraulic system of claim 10, wherein the relief valve is provided with a third biasing element that is configured to bias the relief valve into a flow-blocking position.

12. The hydraulic system of claim 11, wherein a relief pressure setting associated with the third biasing element of the relief valve is more than an actuation pressure setting associated with the second biasing element of the outlet valve such that a pressure of fluid downstream of the hydraulic motor is configured to open the relief valve prior to opening the outlet valve when the solenoid-operated check valve is in the blocking position.

13. The hydraulic system of claim 12 further comprising a recirculation line fluidly coupled with the second inlet passage and the first outlet passage, the recirculation line having a unidirectional spring-loaded anti-cavitation check valve disposed therein, the anti-cavitation check valve being configured to selectively allow fluid to be recirculated from the first outlet passage downstream of the hydraulic motor to the second inlet passage upstream of the hydraulic motor.

14. The hydraulic system of claim 13, wherein a pressure setting associated with the anti-cavitation valve is less than the relief pressure setting associated with the relief valve.

15. The hydraulic system of claim 13, wherein a pressure setting associated with the anti-cavitation valve is less than a pressure setting of the second biasing element associated with the outlet valve.

16. The hydraulic system of claim 1 further comprising a bypass line configured to fluidly couple the first inlet passage with the second inlet passage, the bypass line including a second orifice disposed therein for permitting fluid with a reduced pressure and flow rate as compared to a pressure and flow rate of fluid in the first inlet passage.

17. The hydraulic system of claim 1 further comprising a controller communicably coupled with the solenoid-operated check valve, the controller configured to control an operation of the solenoid-operated check valve.

* * * * *